US005662080A

United States Patent [19]

[11] Patent Number: 5,662,080

Isono et al.

[45] Date of Patent: Sep. 2, 1997

[54] ENGINE CRANKCASE

[75] Inventors: Yoshihiro Isono; Toshiyuki Takahashi, both of Iwata, Japan

[73] Assignee: Yamaha Hatsudoki Kabushiki Kaisha, Iwata, Japan

[21] Appl. No.: 556,375

[22] Filed: Nov. 13, 1995

[30] Foreign Application Priority Data

Nov. 12, 1994 [JP] Japan .................................... 6-303135

[51] Int. Cl.$^{6}$ ................................ F02F 7/00; F16N 31/00

[52] U.S. Cl. ......................... 123/195 C; 184/6.2; 184/106

[58] Field of Search ........................... 123/195 C, 195 M; 184/6.2, 6.23, 106

[56] References Cited

U.S. PATENT DOCUMENTS

| | | | |
|---|---|---|---|
| 2,381,745 | 8/1945 | Herreshoff et al. | 123/195 H |
| 4,473,042 | 9/1984 | Kikuchi | 123/195 H |
| 4,876,998 | 10/1989 | Wünsche | 123/195 H |
| 4,911,118 | 3/1990 | Kageyama et al. | 123/195 H |
| 4,930,469 | 6/1990 | Kamprath | 123/195 C |
| 4,986,235 | 1/1991 | Ishii et al. | 123/195 C |
| 5,130,014 | 7/1992 | Volz | 123/195 C |
| 5,136,993 | 8/1992 | Ampfever | 123/195 C |
| 5,404,847 | 4/1995 | Han | 123/195 H |
| 5,469,822 | 11/1995 | Mechsner | 122/195 C |
| 5,526,781 | 6/1996 | Sugiyama et al. | 123/195 C |

*Primary Examiner*—Erick R. Solis
*Attorney, Agent, or Firm*—Knobbe, Martens, Olson & Bear LLP

[57] ABSTRACT

Several embodiments of crankcase assemblies for internal combustion engines, wherein the crankcase is configured in such a way as to avoid the loss of oil at the pick-up device, even during sudden maneuvering. This is accomplished in such a way so that the oil will not contact the moving components within the crankcase during normal engine operations so as to avoid churning. In addition, the crankcase is configured in such a way as to provide a plurality of air gaps defined by facing surfaces of the crankcase member so as to provide sound deadening and higher strength with a lighter weight material.

12 Claims, 12 Drawing Sheets

ENGINE CRANKCASE

BACKGROUND OF THE INVENTION

This invention relates to a four-cycle internal combustion engine and more particularly to an improved crankcase therefor.

In many forms of four-cycle internal combustion engines, the crankcase, in addition to providing a surrounding location for the crankshaft, also contains the lubricant, which is circulated through the engine for its lubrication. This lubricant is then returned to the crankcase for recycling. Such lubrication systems are called "wet sump engines."

There is a disadvantage with this type of lubrication system. Because the crankcase chamber must contain all of the lubricant for the engine, there tends to become an increase in height of the overall engine. The reason for this is that it is desirable, if not essential, that the crankshaft and other rotating components in the crankcase do not contact the oil. If they do, they will cause churning and aeration of the oil. This also creates drag on the rotating components.

Therefore, it has been the practice to provide oil pans that have a length which is substantially equal to the length of the engine. However, this presents some problems in and of itself. If the engine is mounted in a fore and aft direction so that the crankshaft rotates about an axis longitudinal of an associated vehicle, then sudden accelerations or decelerations can cause the oil level in the crankcase to change. Since the oil is picked up through a pick-up device at a specific location in the crankcase which is generally at its midpoint, this means that the oil may actually move away from the pick-up. Thus, air rather than oil will be pumped, obviously not a desirable condition.

A similar problem exists if the engine is placed transversely in the engine compartment, as it is in many front-engine, front-wheel drive or rear-engine, rear-wheel drive applications. With such an arrangement, sudden changes in direction such as cornering to the right or the left can cause a similar problem to occur with the oil pick-up.

It is, therefore, a principal object of this invention to provide an improved crankcase assembly for an internal combustion engine.

It is a further object of the invention to provide an improved crankcase assembly for an internal combustion engine that will accommodate sufficient oil and yet not be obtrusive in size and also reduce the likelihood of sloshing of the oil in the crankcase resulting in the pick up of air rather than oil.

In order to provide large volumes, the exterior surface area of the crankcase also becomes quite largely since it is desirable to maintain light weight, the crankcase is generally formed from a thin material, and this can give rise to the generation of noises. That is, the extensive but thin-walled crankcase may resonate and create objectionable sounds.

It is, therefore, a still further object of this invention to provide an improved crankcase construction for an internal combustion engine wherein the crankcase is configured to provide adequate volume, and yet its surface area is such that sounds cannot easily emanate from the crankcase due to vibrations.

SUMMARY OF THE INVENTION

This invention is adapted to be embodied in an internal combustion engine having a crankshaft that is confined at least in part by a crankcase member that extends along at least one side of the crankcase and which is positioned vertically beneath it. The engine has a lubricating system that includes an oil pick-up that is disposed at a specific location in the crankcase in a direction longitudinally of the crankshaft. The crankcase is formed with at least one outwardly extending projection extending transversely outwardly relative to the crankshaft axis and in the area of the oil pick-up. The lower wall of this projection is spaced vertically above the lower wall that extends beneath the oil pick-up so as to provide increased volume and to minimize the amount of lubricant that can be transferred into the projection area when a vehicle powered by the engine is maneuvered.

Another feature of the invention is also adapted to be embodied in an internal combustion engine that has a crankshaft that is rotatable about a longitudinally extending axis and which is enclosed at least in part by a crankcase member that extends below the crankshaft axis. In accordance with this feature of the invention, the outer periphery of the crankcase is defined by a wall that is configured to provide a cavity between facing walled surfaces for sound-deadening purposes.

DETAILED DESCRIPTION OF THE PREFERRED EMBODIMENT OF THE INVENTION

Figure 1:
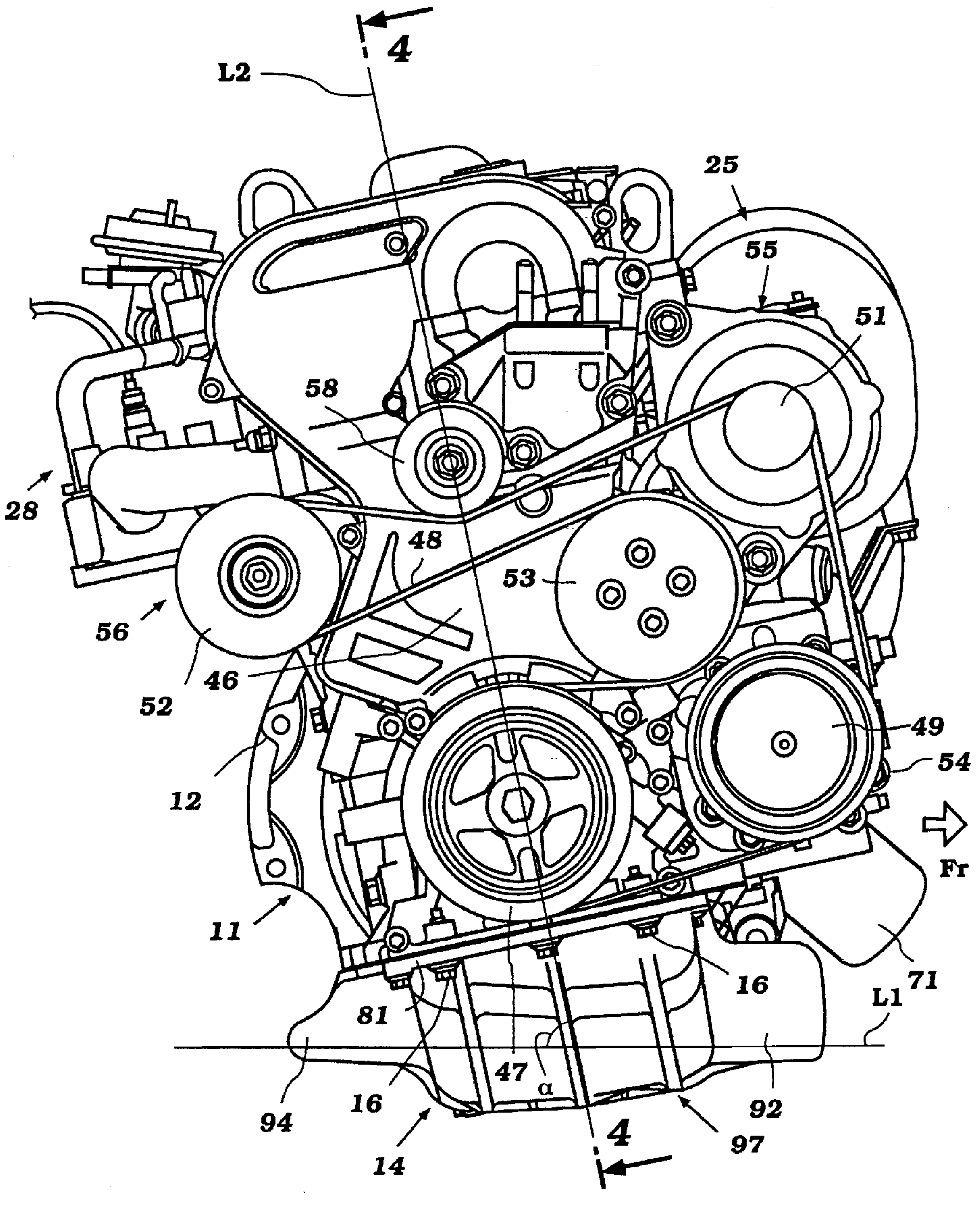
FIG. 1 is a side elevational view of an internal combustion engine constructed in accordance with an embodiment of the invention.
Figure 2:
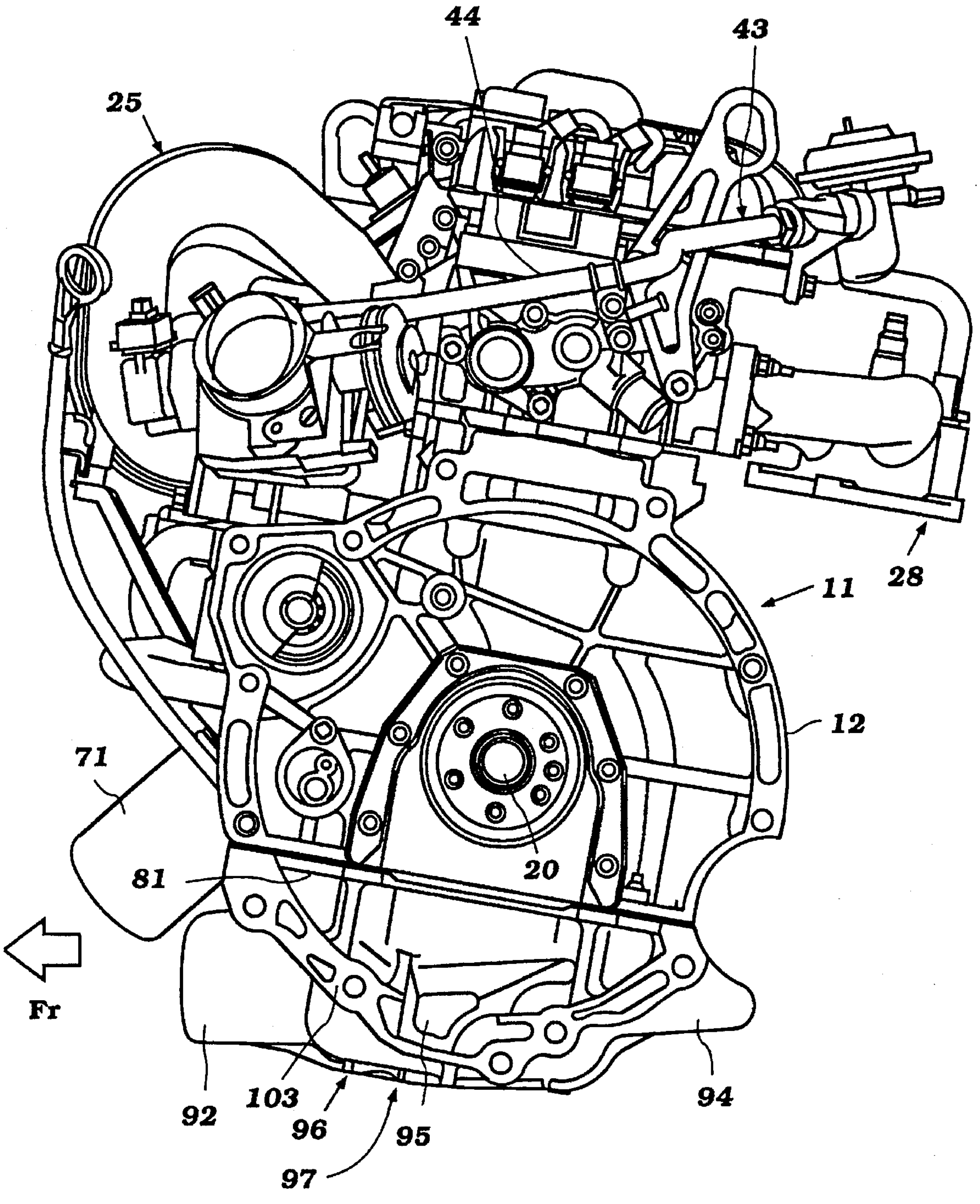
FIG. 2 is a side elevational view from the opposite side of the internal combustion engine shown in FIG. 1.
Figure 3:
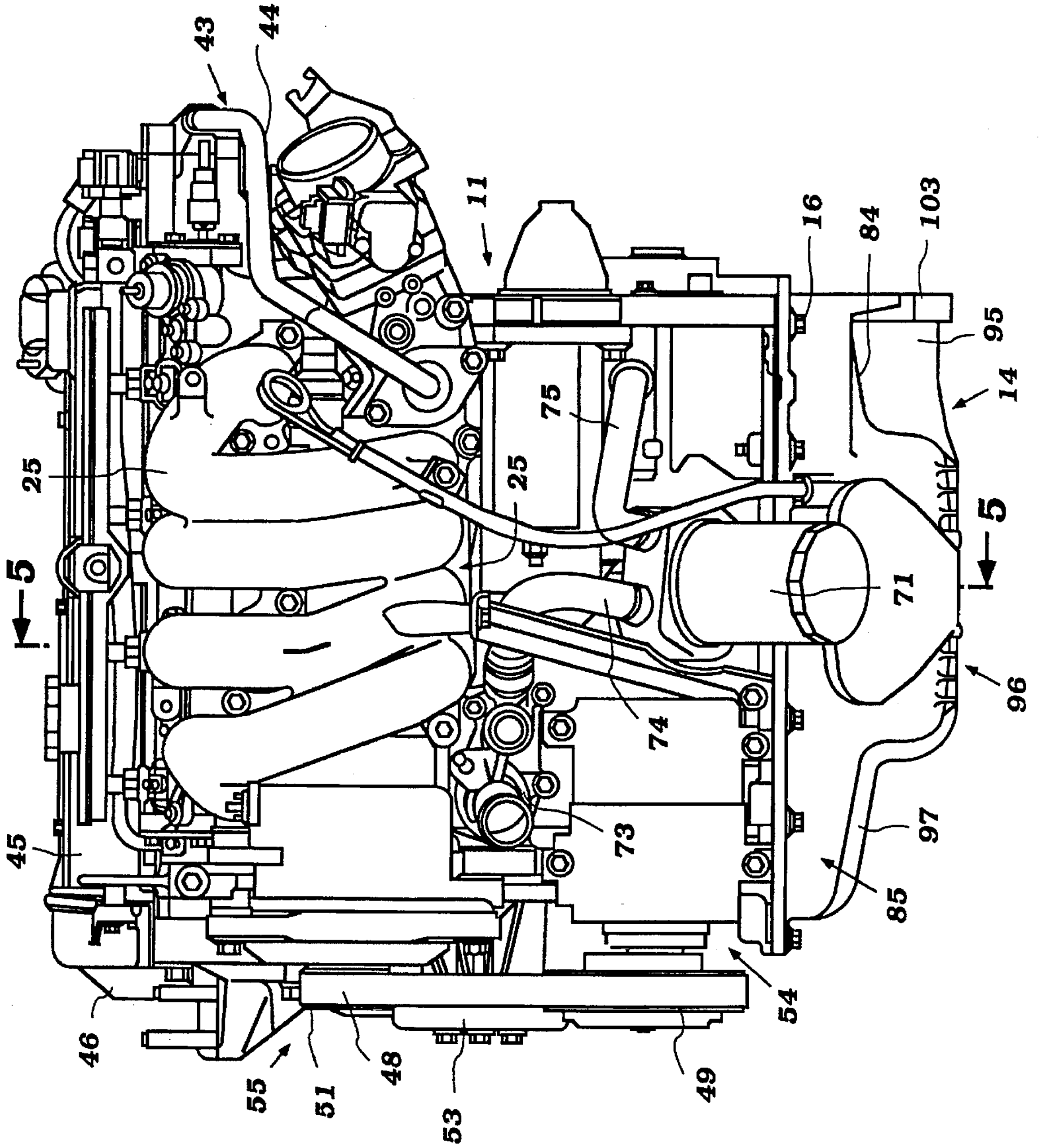
FIG. 3 is a front elevationl view of the internal combustion engine.

Referring now in detail to the drawings and initially to FIGS. 1 through 5, a four cycle internal combustion engine constructed in accordance with the embodiment of the invention is identified generally by the reference numeral 11. The engine 11 may be of any known configuration such as an in-line engine as shoe, a V-type engine or an opposed engine and may have any number of cylinders.

The engine 11 is provided with a cylinder block crankcase assembly, indicated generally by the reference numeral 12 and composed of a cylinder block 13 and a crankcase member 14 that are fixed to each other in any suitable manner. The crankcase member or oil pan 14 is attached to the undersurface of the cylinder block 13 by means of the bolts 16 and serves as the oil reservoir for the engine 11. The construction of the crankcase member 14 will be described in more detail later.

The cylinder block 13 is provided with cylinder bores 17 in which pistons 18 reciprocate and which extend at an angle from vertical as shown in FIG. 1. This position is chosen in the illustrated embodiment to facilitate use in a front engine, front wheel drive motor vehicle. Other uses and orientations are possible with the invention as will be apparent.

Each piston 18 is pivotally connected by means of a piston pin (not shown) to the small end of a connecting rod 19. The big end of the connecting rod 19 is journaled on the throw of a crankshaft, indicated generally by the reference numeral 20 which is rotatably journaled within a crankcase chamber formed in major part by the crankcase member 14. A cylinder head assembly, indicated generally by the reference numeral 21, is affixed to the upper surface of the cylinder block 13 in any well known manner. The cylinder head 21 has a recess 22 formed in its lower surface associated with each cylinder bore 18. In each of these recesses a spark plug 23 is positioned. The recess 22 aligns with the cylinder bore 17 and the head of the piston 17 to form the individual combustion chambers of the engine 11. The recess 22 can be referred to as the combustion chamber since at top dead center (TDC) its volume comprises the major portion of the clearance volume.

A pair of intake passages 24 extends through one side of the cylinder head 21 and is served by an induction and charge forming system (not shown) through an intake manifold 25. The intake passages 24 terminate at their inner sides at a pair of valve seats which are each controlled by R separate intake valve 26.

In a similar manner, a pair of exhaust passages 27 extend through the opposite side of the cylinder head 21 and serve an exhaust manifold 28. The exhaust passages 27 begin at respective valve seats which are controlled by a pair of exhaust valves 29.

The intake and exhaust valves, 26 and 29 respectively, are operated by respective cam lobes 31 and 32 through respective valve tappets 33 and 34. The cam lobes 31 and 32 form a portion of respective overhead camshafts 35 and 36 that are journaled for rotation in the cylinder head 21 in a known manner. Affixed to one end of the camshafts 35 and 36 are sprockets 37 and 38 respectively which are driven at one half engine speed by a crankshaft sprocket 39 affixed to the crankshaft 20 and driving the sprockets 37 and 38 via a cam belt 41.

A blowby or crankcase ventilation gas outlet passage extends rearwardly through the cylinder head 21 below the exhaust camshaft 36 and serves a blowby gas recirculation control device 43 which is mounted to the rear of the cylinder head 21 in any suitable manner. This controls the discharge of the gasses to the intake manifold 25 by means of a conduit 44. In this way the escape of hydrocarbons directly to the atmosphere is reduced.

The cylinder head 21 is fully enclosed by a cam cover 45 mounted above the overhead camshafts 35 and 36 and a side cover 46 which covers the camshaft sprockets 37 and 38.

A pulley 47 is affixed to one end of the crankshaft 19. A serpentine belt 48 is in engagement with the crankshaft pulley 47 and likewise engages a power steering pump pulley 49, a fuel pump pulley 51, an alternator pulley 52, and an water pump drive pulley 53. Thus, a power steering pump 54, a fuel pump 55, an alternator 56 and a water pump(not shown) are all powered from the crankshaft 20. In addition, a tension pulley 58 is also in contact with the serpentine belt 48 and ensures that proper tension is maintained in the serpentine belt 48.

A flywheel 59 is attached to the opposite end of the crankshaft 20 and comprises part of the transmission 61. The transmission 61 is housed within a transmission case 62 which is affixed to a side of the cylinder block 13 and the crankcase member 14 in any suitable manner.

An oil strainer 63, in which is positioned a suction inlet 64, is mounted towards the bottom of the crankcase member 14 by means of attachment arms 65 for picking up the oil from the crankcase chamber. The attachment arms 65 are affixed at their upper ends to an attachment plate 66 which, in turn, is fixed to the bottom surface of the cylinder block 13. A conduit 67 extends from the oil strainer 63 up to an oil pump housing 68 in which is positioned an oil pump 57 driven directly from the crankshaft 20. The oil pumped by the oil pump 57 is delivered through internal passages, not shown, to an oil filter 71 mounted on the front of the engine 11. after passing through the oil filter 71 the oil flows to the lubricated parts of the engine 11 from a main delivery passage 70 and suitable internal passages (not shown).

The oil filter 71 is mounted on an oil cooler 72 which receives water pumped by the aforenoted water pump from a thermostat housing 73 (FIG. 3) through a hose 74. After cooling the oil flowing through the filter 71 this water is returned to the engine cooling jacket through a hose 75.

The construction of the crankcase member will now be described. Conventionally the crankcase member 14 extends along the length and width of the engine 11 and tends to increase the overall height of the engine 11, since the oil level in the crankcase member 14 must be far enough below the crankshaft 20 and other rotating components of the crankcase to ensure that the oil is not contacted by the above rotating components. As has been noted, this creates a problem in that sudden changes in vehicle direction such as would occur when cornering can cause the oil level in the crankcase member 14 to change and in the extreme case expose the oil suction inlet 64 above the oil level to the air, which is not a desirable situation. A similar problem would occur with fore/aft mounted engine under vehicle acceleration or deceleration.

Also, since the crankcase member 14 extends along much, if not all, of the lower surface of the engine 11 it tends to be a large, and thus heavy part, which is again an undesirable situation. This situation is typically eliminated by decreasing the gage of the crankcase member But this has a negative effect in that the downgaged crankcase member 14 is more easily induced by the engine to vibrate and thus create undesirable noise during normal engine operation.

Both of the above adverse conditions are eliminated by the crankcase member design illustrated in FIGS. 6 through 13 and now to be described. The crankcase member 14 is configured so as to supply oil to the suction inlet 64 under all normal operating conditions, while at the same time the crankcase member 14 is stiff enough to raise the natural vibrational frequencies of the structure above those levels inputted to the crankcase member 14 by the engine 11.

The crankcase chamber 14 is comprised of a horizontal flat flange surface 81 that is affixed to the underside of the engine block 13 by means of the bolts 16 as aforenoted. Vertical walls 83 depend downwardly from the inside edge of the flange 81 and connect at their lower end to walls 84 which are slightly inclined from horizontal. This forms a relatively shallow oil reservoir portion 85 of the crankcase member 14.

Figure 4:
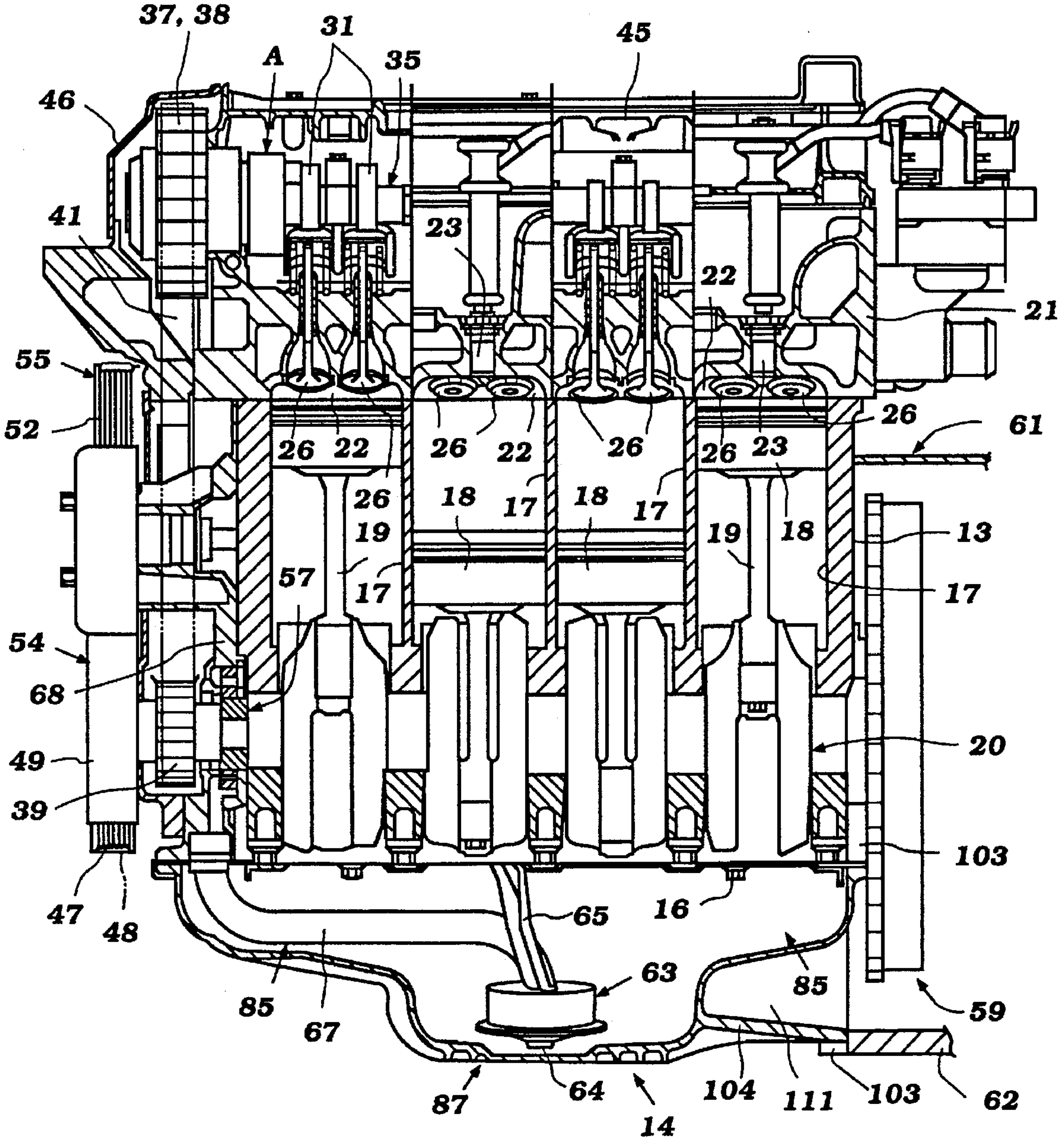
FIG. 4 is a cross-sectional view taken along line 4—4 of FIG. 1 and shows the location of the various components of the engine.
Figure 5:
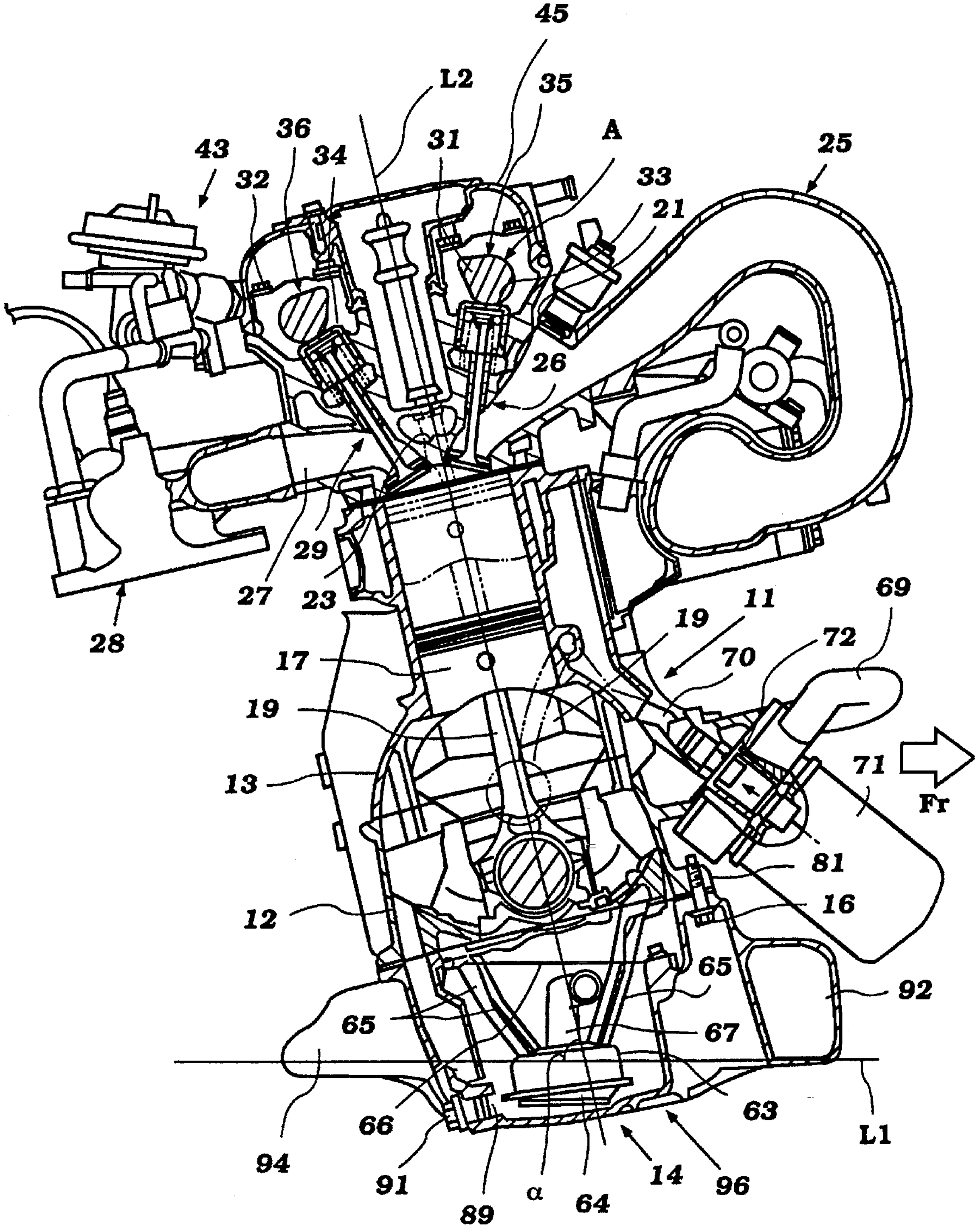
FIG. 5 is a cross-sectional view taken along 5—5 of FIG. 3 and shows a single cylinder of the engine along with its reciprocating components, overhead valve assembly, and lubrication sump.
Figure 6:
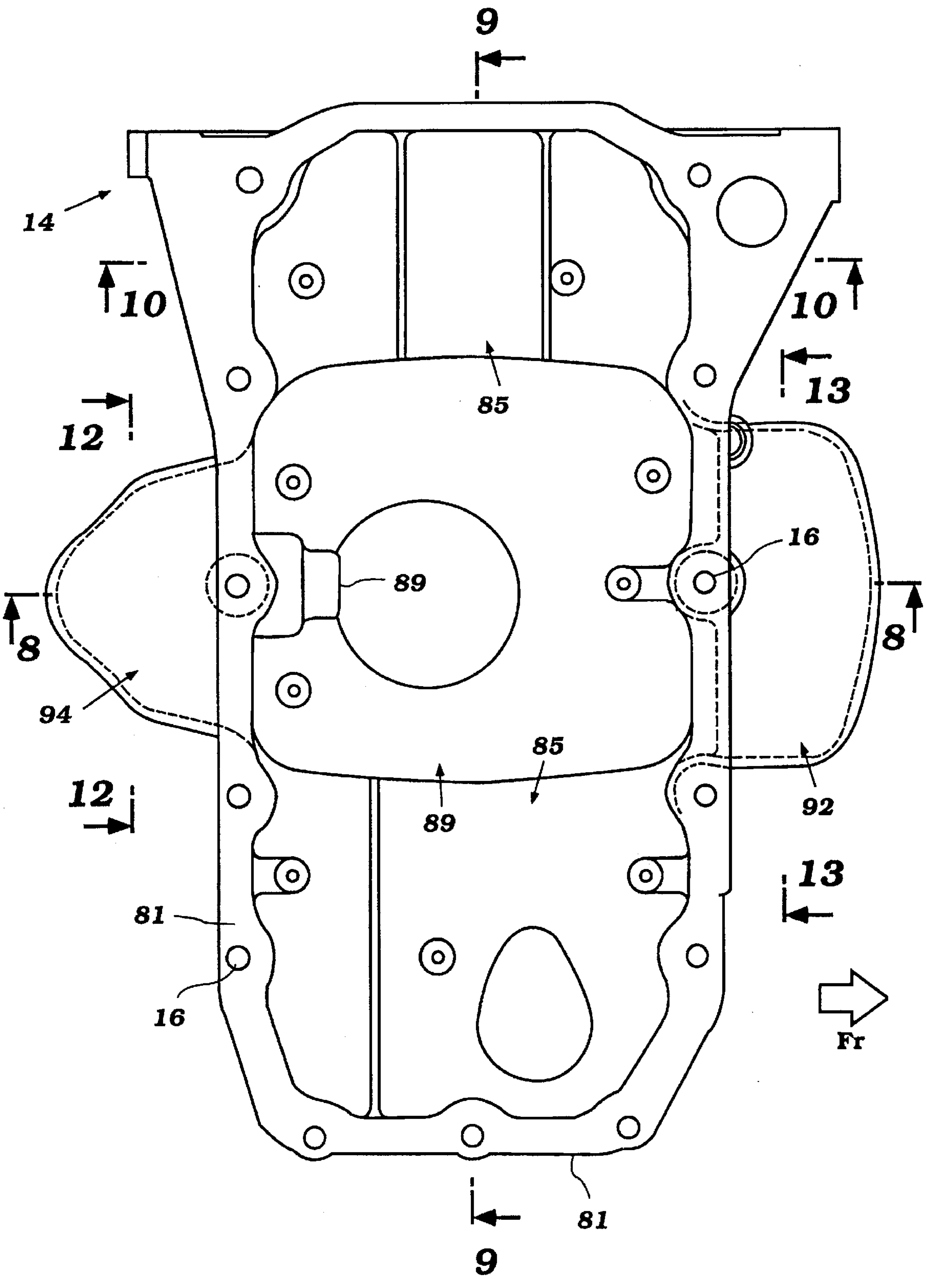
FIG. 6 is a top plan view of the crankcase member of the engine.
Figure 7:
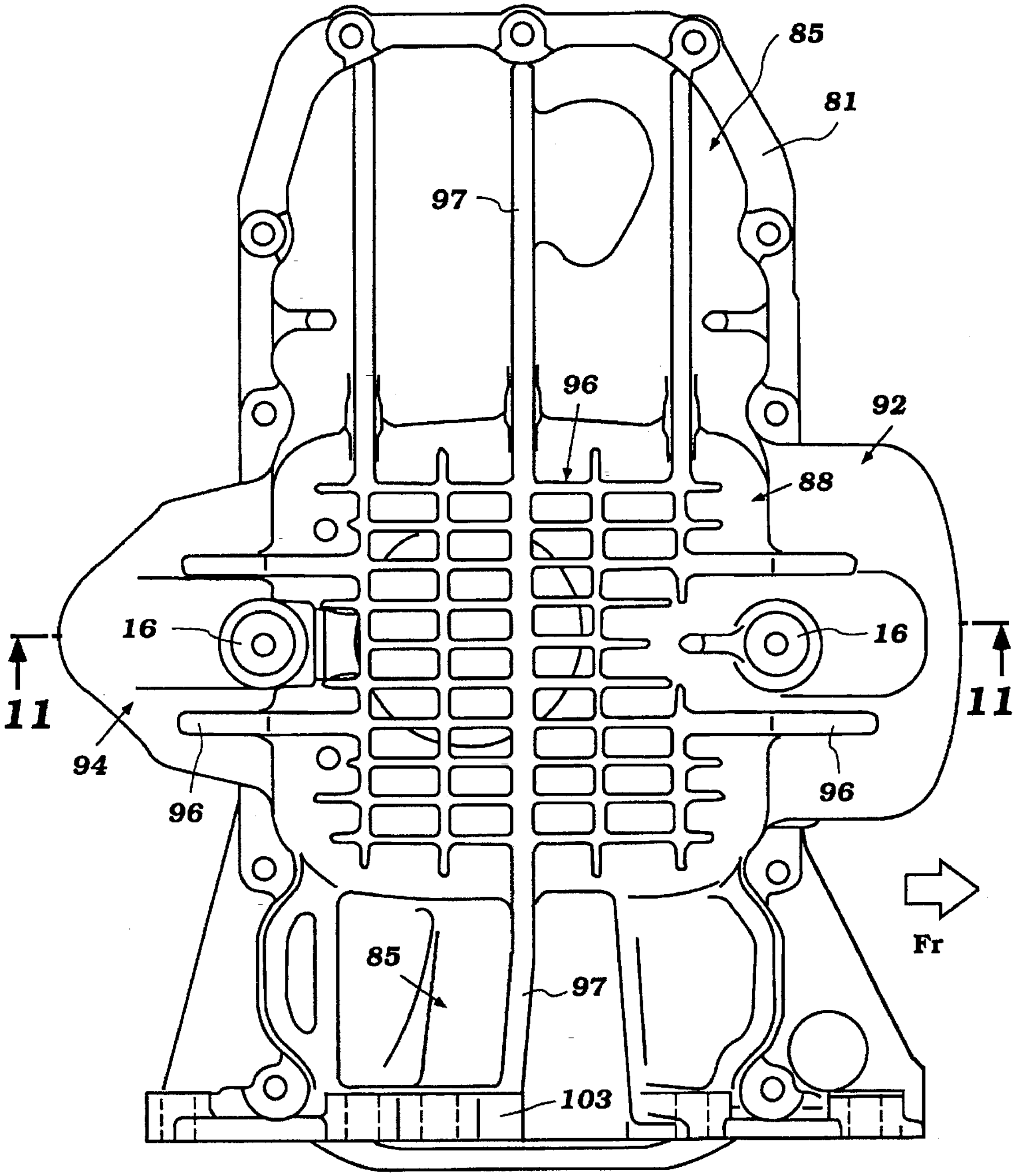
FIG. 7 is a bottom plan view thereof.

Vertical walls 86 extend further downwards from the inner edges of the walls 84 and connect at their lower end to a bottom surface 87 of the crankcase member 14 which, together with the walls 86 forms a deep oil reservoir portion 88 of the crankcase member 14 in which is positioned the oil strainer 63, as can best be seen in FIG. 4. An oil drain opening 89, in which is positioned a plug 91, is located behind the strainer 63 in the lowermost portion of the vertical wall 86.

Figure 8:
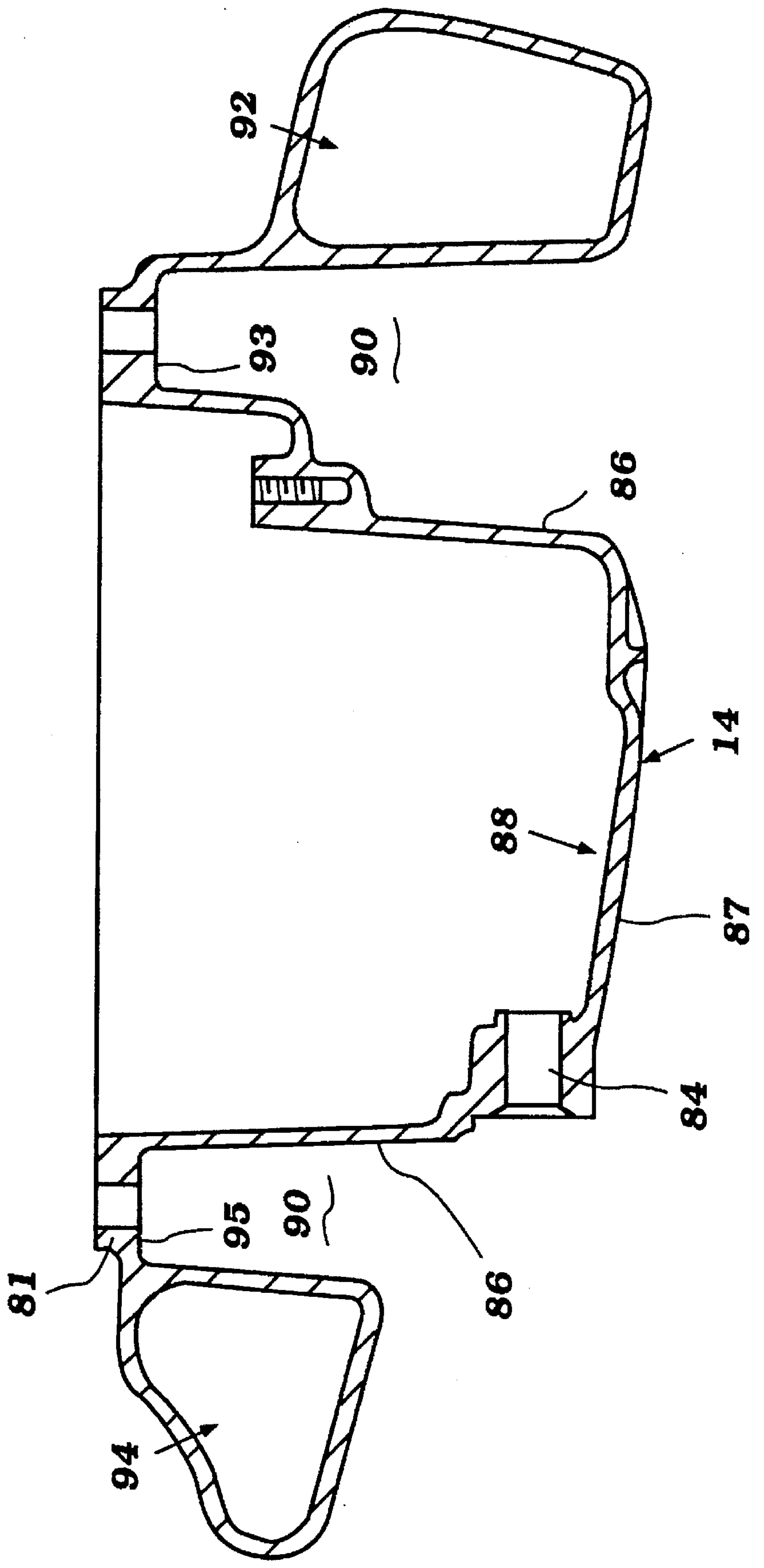
FIG. 8 is a cross-sectional view taken along line 8—8 of FIG. 6 and shows the longitudinal center section of the crankcase member.
Figure 11:
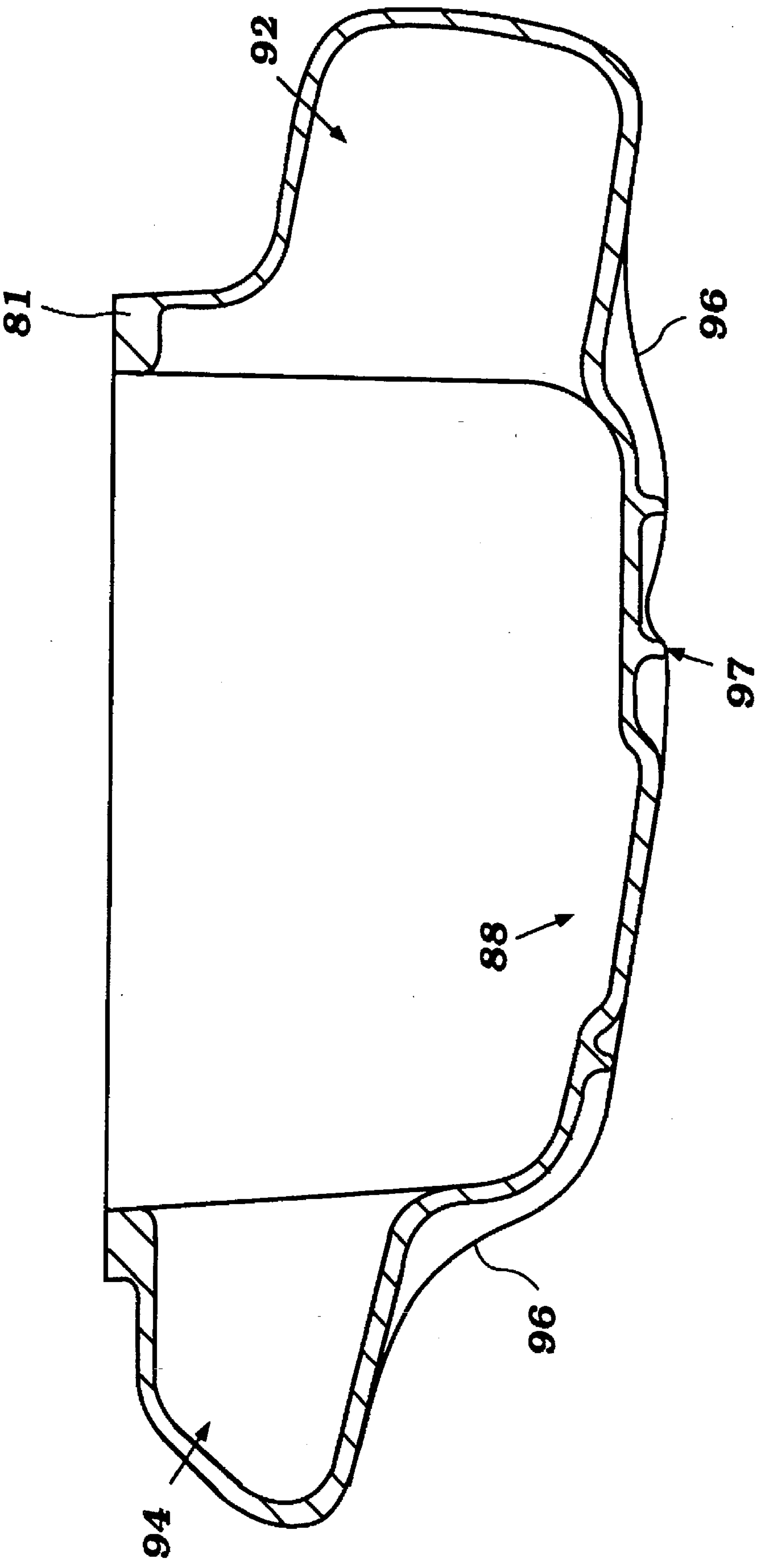
FIG. 11 is a cross-sectional view taken along line 11—11 of FIG. 7 and shows a longitudinal section of the crankcase member.
Figure 13:
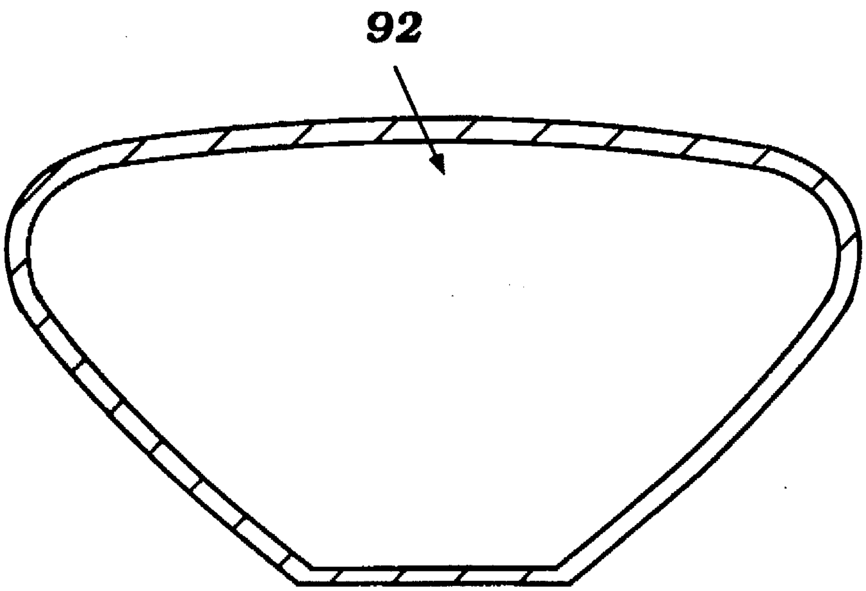
FIG. 13 is a cross-sectional view taken along line 13—13 of FIG. 6 and shows a section for the front extending portion of the crankcase member.

A front extending oil reservoir 92 is positioned forward of the deep oil reservoir 88 and in fluid communication thereto. As can be seen in FIGS. 11 and 13 the front extending oil reservoir 92 has an inverted triangle section whose lower surface is disposed somewhat above the lower surface 87 of the deep oil reservoir 88. A concave area 93 extends upwardly between the front and the major portion 92 and the major portion of the front wall 86 to define a sound deadening cavity 90 therebetween (FIG. 8).

Figure 12:
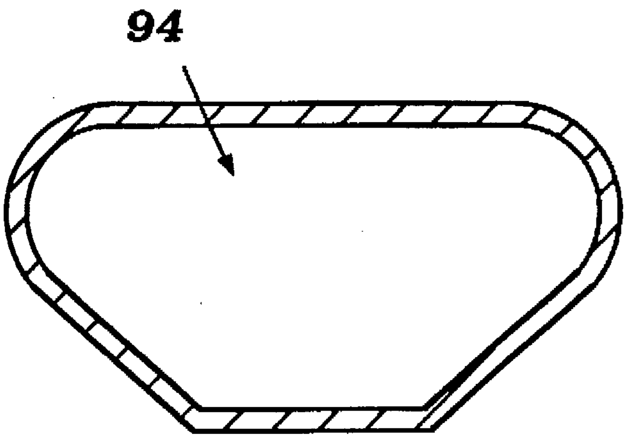
FIG. 12 is a cross-sectional view taken along line 12—12 of FIG. 6 and shows a section for the rear extending portion of the crankcase member.

In like manner a rear extending oil reservoir 94 is positioned rearward of the deep oil reservoir 88 and in fluid communication thereto. As seen in FIGS. 11 and 12 the rear extending oil reservoir 94 also has an inverted triangle section whose lower surface is disposed somewhat above the lower surface 87 of the deep oil reservoir 88. A concave area 95 extends upwardly between the rear extending oil reservoir 94 and the major portion of the rear reservoir portion wall 86. This forms a further sound deadening cavity 90.

A number of longitudinally extending ribs 96 age disposed along the outer surface of the deep oil reservoir 88 and along a portion of the outer surface of both the front and rear extending oil reservoirs 92 an 94 respectively. In a similar manner transversely extending ribs 97 are disposed along the outer surface of the deep and shallow oil reservoirs 88 and 85 respectively orthogonal to and intersecting the longitudinal ribs 96. These ribs add strength to the crankcase member 14 and also assist in heat dissipation.

Figure 9:
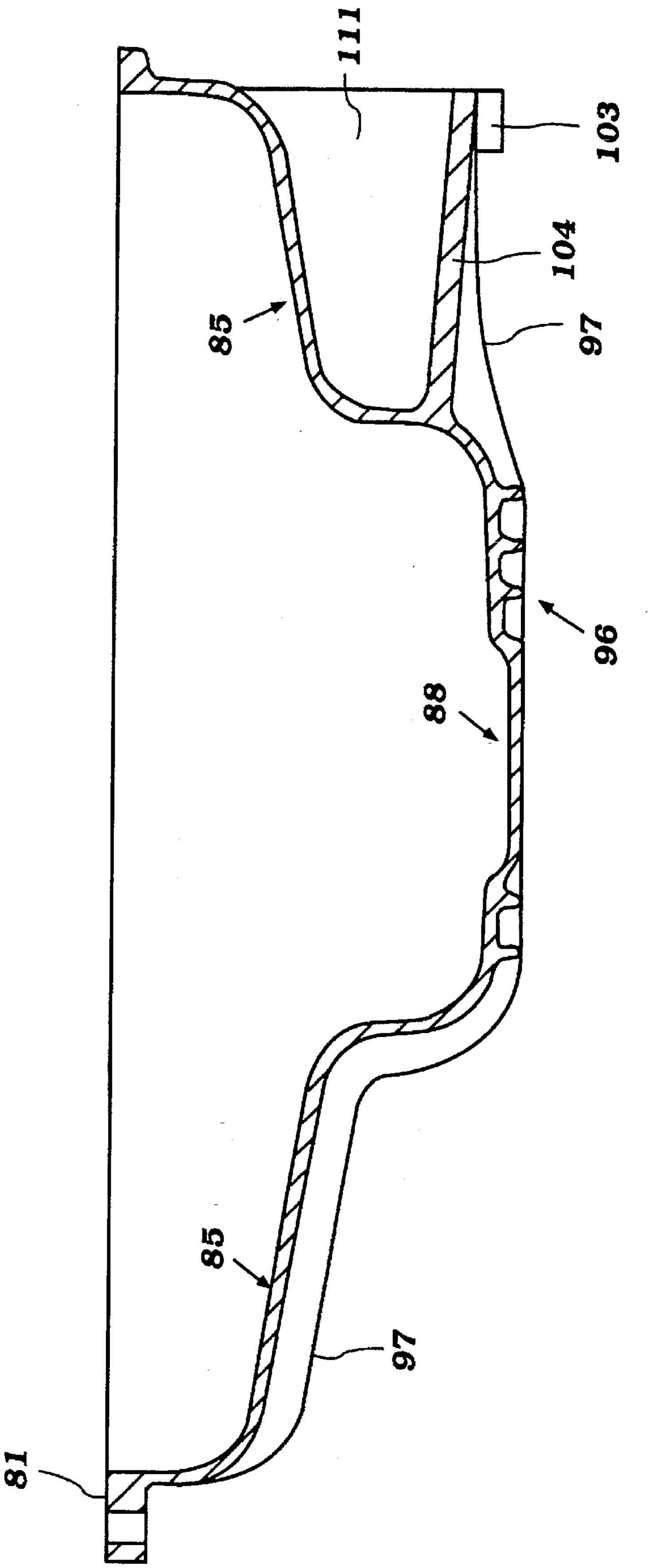
FIG. 9 is a cross-sectional view taken along line 9—9 of FIG. 6 and shows the transverse center section of the crankcase member.
Figure 10:
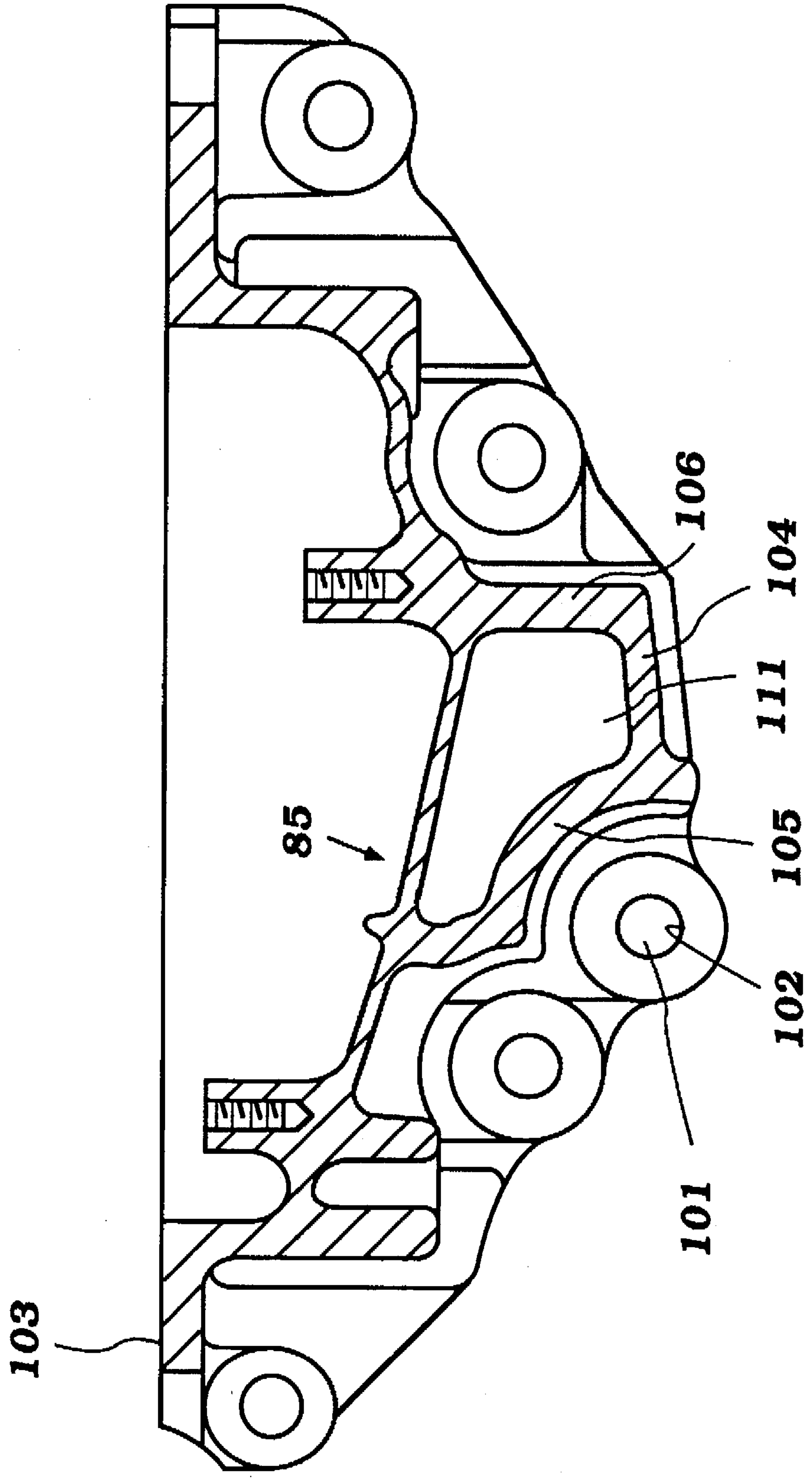
FIG. 10 is a cross-sectional view taken along line 10—10 of FIG. 6 and shows a longitudinal section of the crankcase member.

As is shown in FIG. 4 a portion of the transmission case 62 is affixed to one end of the crankcase member 14 by means of bolts 101 which threadingly engage through the transmission case 62 to the bolt holes 102 positioned along the transmission junction surface 103 of the crankcase member 14, as seen in FIG. 10. Also shown in FIGS. 9 and 10 is an extended bottom wall 104 which connects at its inside end to the bottom portion of the deep oil reservoir vertical wall 86 and whose outer end terminates at the plane defined by the transmission junction surface 103. The extended bottom wall 104, vertical wall 86, and slightly declined wall 84 define a concave area 111 which is bounded along its sides by walls 105 and 106 respectively and open at its outer end to the transmission case 62.

The above described crankcase member configuration eliminates the possibility of the suction inlet 64 being exposed to the air above the level of the oil when the vehicle changes directions since the oil in the deep oil reservoir 88 is gravitationally impeded from climbing into the shallow oil reservoir 85, and also because the inverted triangular section of the front and rear extending oil reservoirs 92 and 94 respectively tend to direct the oil from those reservoirs into the deep oil reservoir 88.

The above configuration for the crankcase member 14 is also sufficiently stiff to ensure that the crankcase member 14 cannot be induced to resonate by the engine 11 since the ribs 97 and 98 and the bottom wall 104 add enough stiffness to the structure to effectively raise the natural frequencies of the crankcase member 14 above those frequencies received from the engine 11 while it is in operation. Also, the concave areas 93, 95 and 111 respectively effectively serve as sound deadening areas to further reduce any noise generate in the crankcase chamber 14.

Thus, from the foregoing description it should be readily apparent that the embodiments of the invention are particularly adapted in providing a wet sump crankcase arrangement for an internal combustion engine that has adequate capacity, that can accommodate maneuvering of the associated vehicle without the oil pick-up drawing air, and which eliminates the possibility of churning in the crankcase. In addition, the peripheral wall of the crankcase is formed in such a way as to provide sound deadening.

Of course, the foregoing description is that of preferred embodiments of the invention, and various changes and modifications may be made without departing from the spirit and scope of the invention, as defined by the appended claims.

What is claimed is:

1. An internal combustion engine having a crankshaft rotatable about a longitudinally extending axis, a crankcase member extending along at least a portion of one side of said crankshaft and defining with other components of said engine a crankcase chamber in which said crankshaft rotates, the upper surface of said crankcase member forming a pair of flange portions extending generally parallel to and on opposite sides of the rotational axis of said crankshaft and defining the outer peripheral edges of an opening at the top of said crankcase member for sealing engagement with certain of said other components of said engine, an oil pick-up depending within Said crankcase member at a location along the axis of the crankshaft and between said flanges for drawing oil by an oil pump for lubrication of said engine, said crankcase member having a projection extending from at least one side thereof at a point axially aligned with said oil pick-up and transversely outwardly of the flange at said one side, the lower wall of said crankcase member extending below said oil pick-up being disposed at a deeper level than the lower wall of said projection so that oil can flow into said projection upon maneuvering of an associated vehicle powered by said engine without leaving the oil pick-up dry.

2. An internal combustion engine as set forth in claim 1, wherein the oil pick-up is disposed below the lower wall of the projection.

3. An internal combustion engine as set forth in claim 2, wherein the crankcase member is affixed to a cylinder block and a cylinder head is affixed to the end of the cylinder block opposite to the crankcase member.

4. An internal combustion engine as set forth in claim 1, wherein there are a pair of projections extending in opposite sides from the crankcase member in the vicinity of the oil pick-up and beyond the flange at the respective side and the lower wall of each of said projections is disposed shallower than the lower wall of the remaining portion of the crankcase below the oil pick-up.

5. An internal combustion engine as set forth in claim 4, wherein the oil pick-up is disposed below the lower wall of the projection.

6. An internal combustion engine as set forth in claim 5, wherein the crankcase member is affixed to a cylinder block and a cylinder head is affixed to the end of the cylinder block opposite to the crankcase member.

7. An internal combustion engine as set forth in claim 6, wherein the projections and the remaining portion of the crankcase member have facing surfaces for providing air gaps therebetween for sound deadening.

8. An internal combustion engine as set forth in claim 1, wherein the projection and the remaining portion of the crankcase member have facing surfaces for providing an air gap therebetween for sound deadening.

9. An internal combustion engine as set forth in claim 8, wherein there is a further double-walled portion of the crankcase member that defines a further air gap for sound deadening, only one of said walls defining said further gap being contacted by the lubricant in the crankcase.

10. An internal combustion engine as set forth in claim 9, further including a transmission affixed to the end of the engine adjacent the further cavity.

11. An internal combustion engine having a crankshaft rotatable about a longitudinally extending axis, a crankcase member affixed to said engine and defining with said engine a crankcase chamber in which said crankshaft rotates, said crankcase member being defined by a first external wall that has a first pair of facing side portions for defining a first silencing air gap therebetween and a second external wall defining a second pair of facing side portions defining a second silencing air gap therebetween, both side portions of said first silencing air gap being in contact with lubricant and only one of the side portions defining said second silencing air gap being in contact with a lubricant.

12. An internal combustion engine as set forth in claim 11, further including a transmission affixed to the engine in abutting relationship with the crankcase member second silencing air gap.

* * * * *